United States Patent [19]

Barley

[11] 4,384,701
[45] May 24, 1983

[54] FORE AND AFT ADJUSTMENT AND ISOLATION ASSEMBLY

[75] Inventor: Geoffrey W. Barley, Brookfield, Wis.

[73] Assignee: UOP Inc., Des Plaines, Ill.

[21] Appl. No.: 192,765

[22] Filed: Oct. 1, 1980

[51] Int. Cl.³ .................. F16M 13/00; B60H 1/02
[52] U.S. Cl. .................................. 248/561; 248/393; 248/430; 248/638; 296/65 R
[58] Field of Search ............... 248/430, 429, 561, 393, 248/631, 638; 267/131; 296/65 R; 297/314

[56] References Cited

U.S. PATENT DOCUMENTS

| | | | |
|---|---|---|---|
| 1,943,550 | 1/1934 | Potter | 248/430 |
| 2,723,711 | 11/1955 | Duncan | 248/429 X |
| 2,770,286 | 11/1956 | Weller | 297/314 |
| 2,892,483 | 6/1959 | De Rose | 248/430 X |
| 3,100,617 | 8/1963 | Radke et al. | 248/430 |
| 3,258,241 | 6/1966 | Oswald | 248/430 |
| 4,194,716 | 3/1980 | Barecki et al. | 248/561 X |

FOREIGN PATENT DOCUMENTS

| | | | |
|---|---|---|---|
| 782871 | 4/1968 | Canada | 248/429 |
| 687090 | 2/1953 | United Kingdom | 248/430 |
| 2013771 | 8/1979 | United Kingdom | 248/430 |

Primary Examiner—James T. McCall

Attorney, Agent, or Firm—James R. Hoatson, Jr.; Barry L. Clark; William H. Page, II

[57] ABSTRACT

Fore and aft isolator assembly for a suspended vehicle seat permits the operator to rotate a single control lever in one direction to allow the seat to be moved to any desired fore and aft position and in the opposite direction to lock the seat in that position in either a fixed manner relative to the seat base or in an "isolate" mode where it is free to travel back and forth to a limited degree against resilient elements. The assembly permits the seat to have a very low profile limited only by the clearance required for the suspension structure. It includes an intermediate frame having a series of rack teeth which is positioned between top and bottom frames attached, respectively, to the seat upper and to the suspension. The bottom frame also incorporates a toothed rack. A rotatable adjusting shaft which is rotatably mounted to the top frame slidably supports the intermediate frame and also fixedly supports a first locking pawl which can engage a selected tooth in the rack on the bottom frame. The shaft also carries a second locking pawl mounted in a "lost-motion" manner in which it can engage the rack on the intermediate frame either when the first locking pawl is engaged in a "seat lockup" position or when it is disengaged in a "seat isolate" position. Further rotation of the shaft will also disengage the second locking pawl when the seat is in a "seat adjust" position.

11 Claims, 3 Drawing Figures

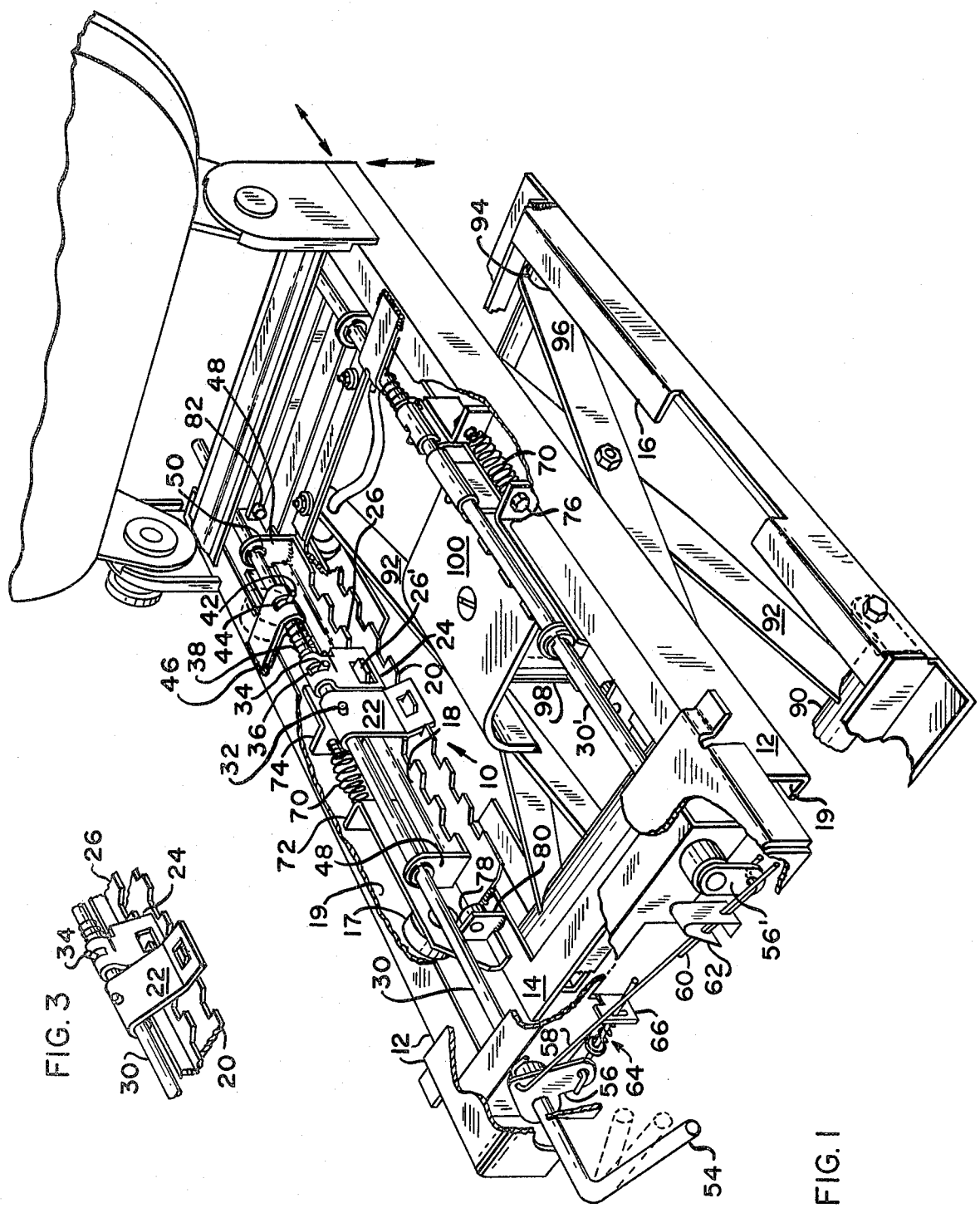

FORE AND AFT ADJUSTMENT AND ISOLATION ASSEMBLY

BACKGROUND OF THE INVENTION

The invention relates to vehicle seats and particularly to a fore and aft adjustment and isolation assembly of the general type disclosed in copending application, Ser. No. 149,206 filed May 12, 1980 and assigned to a common assignee.

Since vehicles, particularly large trucks, must be provided with suspensions which are capable of handling very heavy loads, they cannot offer the smooth ride of a passanger car. In order to protect the driver from fatigue and the great discomfort induced by vehicle vibrations, it is quite common to provide seat suspension systems incorporating mechanical or fluid springs. The springs isolate the driver from the vertical vibrations, but consume a considerable amount of space under the seat. This is especially true in the case of air spring suspensions which are greatly preferred over mechanical suspensions due to the fact that they have a constant natural frequency and can be automatically adjusted to the weight of the occupant. Most seats have slide rails which permit a fore and aft position adjustment and many have a fore and aft isolation feature which isolates the occupant from fore and aft and pitching vibrations and is typically located under the center of the seat pan and above the suspension. When a seat is provided with all of the aforementioned features, it must have its seat pan a considerable distance above the floor in order to accommodate them and becomes too high to be used in certain vehicles which have a relatively limited space between the floor and ceiling. Accordingly, it would appear desirable to have a seat wherein the fore and aft position adjustment and the fore and aft isolation mechanism would not require any more vertical height under the seat.

SUMMARY OF THE INVENTION

The aforementioned and other objects are attained by the fore and aft adjustment and isolation mechanism of the present invention which is constructed as broadly set forth in the accompanying Abstract. The novel construction, which utilizes an intermediate frame positioned between an upper frame attached to the seat upper and a lower frame attached to the seat suspension, permits the seat slide rails and the isolation mechanism to be positioned at the periphery of the frame which carries the seat upper so that an air spring suspension can be positioned immediately under the center of the seat pan, thus insuring that the seat will have a very low profile. A partially rotatable adjustor shaft moves with the seat upper and thus remains conveniently accessible to the operator. The shaft handle can be left horizontal so that a pawl mounted on the shaft will engage an elongated rack on the intermediate frame and lock the intermediate frame to the upper frame in an "isolate" position. In the isolate position, the upper and intermediate frames move as one relative to the lower frame but with the movement being restricted to about 25 mm forwardly and 25 mm rearwardly by a combination tension-compression spring and a pair of bumper stops. When the shaft handle is shifted downwardly, an additional pawl mounted on the shaft will engage an elongated rack on the lower frame while the first mentioned pawl remains in engagement with the intermediate frame. This is the "lockout" position where all the frames are locked to each other. When the shaft handle is temporarily lifted to its uppermost position against the force of a return spring, both pawls are released from their respective racks and the upper frame can be adjusted fore and aft relative to the bottom frame while the intermediate frame floats free except for the restraint provided by the isolator springs.

BRIEF DESCRIPTION OF THE DRAWINGS

FIG. 1 is a perspective view of the improved fore and aft adjustment and isolation assembly showing its relation to a vehicle seat upper support frame and a support base and vertical isolation suspension with the parts of the assembly in a "lockout" mode; and FIGS. 2 and 3 are fragmentary perspective views of portions of the assembly in their "isolate" and "adjust" modes, respectively.

DESCRIPTION OF THE PREFERRED EMBODIMENT

Referring to FIG. 1, the improved fore and aft adjustment and isolation assembly is indicated generally at 10 and consists basically of a movably mounted top or upper seat support frame 12 which carries the seat cushion (not shown) and a bottom or lower frame 14 carried by the seat suspension. The lower frame 14 and suspension move vertically relative to a base frame 16 which is adapted to be bolted to the floor of the vehicle. When desired, the upper frame 12 can be moved relative to the lower frame 14 in a fore and aft direction by means of four rollers 17 which are rotatably mounted on the lower frame 14 for rolling contact with the top and bottom inside surfaces of channel members 19 which constitute the side portions of the upper frame 12. The upper frame 12 and the lower frame 14 may be selectively locked together in any one of a series of fore and aft positions by means of a first toothed rack member 20 carried by the lower frame 14 and a first locking pawl member 22 which can move rotationally but not axially relative to upper frame 12. When the fore and aft vibration isolation mode of operation is desired, the rack 20 and the pawl 22 are disengaged in a manner hereinafter described while a second locking pawl 24 is caused to engage the teeth of a second rack 26 carried by the intermediate frame 18. Both of the pawls 22, 24 are carried by a shaft 30 which is mounted for rotation but against axial movement relative to upper frame 12. A pin 32 causes the first pawl 22 to be positively fixed to shaft 30 and thus rotated as the shaft 30 is rotated. The second pawl member 24 is also mounted to the shaft 30 but by means of a lost-motion connection which includes a pin 34 which is fixed to the shaft and a slot 36 formed in the pawl. A biasing spring 38 causes the second pawl 24 to surround one of the teeth 26' on the rack 26, and be in contact with adjacent teeth.

In order that the assembly 10 can be actuated easily by the occupant of the seat in any position of fore and aft adjustment, the shaft 30 is mounted for limited angular movement but cannot move axially relative to the upper frame 10 by means of a pin 42 carried by the shaft and a slot 44 which is formed in a bracket 46 welded to the upper frame 12. Fore and aft adjustment of the upper frame 12 relative to the lower frame 14 and intermediate frame 18 is accommodated by virtue of the fact that the shaft 30 is slidably mounted in guides 48 and nylon bushings 50 on the intermediate frame 18.

The forward end of the shaft 30 is preferably bent in the manner shown in FIG. 1 so as to form a handle portion 54 by which the seat occupant can rotate the shaft 30 to any desired position. The control plate 56 is welded to the shaft 30 and cooperates with the wire links 58, 60 to transfer the rotation of shaft 30 on the right side of the seat to shaft 30' on the left side of the seat. All of the elements of the isolator assembly are duplicated on each side of the seat and their movements can be synchronized as necessary by the adjustment clip 62 which engages the overlapping wire links 58, 60 and allows their degree of overlap to be varied as required to permit plates 56, 56' to rotate together. An overcenter spring assembly indicated generally at 64 mormally biases the handle 54 to a horizontal operating position wherein the pawls 22, 24 are in the "isolation" mode shown in FIG. 2. In this mode, it can be seen that the first pawl 22 is out of engagement with rack 20 while the second pawl 24 is in engagement with the second rack 26. Thus, the upper frame 12 is locked to the intermediate frame 18 but not to the bottom frame 14. When the handle is in the lower position shown in solid lines in FIG. 1, both pawls 22, 24 will be engaged with their respective racks 20 and 26 so as to provide a "lockout" mode in which the upper frame 12 is rigidly fixed relative to both the lower frame 14 and the intermediate frame 18. When the handle 54 is raised above its horizontal position, each of the pawls 22, 24 will be released from engagement with its respective rack 20, 26 and the seat will be in its "adjust" mode as shown in FIG. 3. In this mode, the upper frame 12 can be freely pushed forward or backward to any position desired by the operator and the pawls 22, 24 carried thereby will each be brought adjacent respectively, either a forward or rearward tooth in the racks 20 and 26. Release of the handle 54 will permit the spring 64 to return the assembly to its FIG. 2 "isolation" mode. The overcenter spring 64 will permit the assembly to be maintained in either its FIG. 2 or FIG. 3 modes.

A combination tension and compression spring 70 which is attached to bracket 72 on lower frame 14 and to bracket 74 on the intermediate frame 18 by bolts 76 is used to provide fore and aft isolation over a limited range of approximately 25 mm in each direction from its equilibrium position. The total range of movement is determined by a pair of stop members comprising a front rubber bumper member 78 carried by bracket 80 which is fixed to the lower frame 14 and a rear rubber bumper member 82 which is mounted to a cross frame member 84 which joins the two sides of the lower frame 14.

It should be readily apparent from FIG. 1 that since the fore and aft adjustment and isolation mechanism 10 is located at the top and sides of the seat upper support frame 12, the base frame 16 can be relatively narrow since it must only support the pivoted ends 90 of the scissors links 92 and the rolling ends 94 of the links 96. Such a narrow base 16 offers the advantage that it can be more readily accommodated to the limited flat floor space which is available on many vehicles. The arrangement of the isolation assemblies 10 on either side of the seat also results in the seat having an extremely low profile since the air spring 98 which provides vertical vibration isolation and its top support plate 100 which is welded to the links 92 can move up between the isolator assemblies and almost into contact with the bottom of the seat pan (not shown).

I claim as my invention:

1. A fore and aft isolator assembly for a suspended vehicle seat comprising a top seat support frame adapted to be attached to the bottom of the seat upper, a bottom frame adapted to be attached to the top of the seat suspension, an intermediate frame mounted between said top and bottom frame for selective fore and aft movement relative to either of said top and bottom frames, the movement of said intermediate frame relative to one of said top and bottom frames being resiliently resisted in an "isolation" mode in both a fore and aft direction by resilient biasing means, an adjusting shaft mounted on said top frame for non-axial, rotary movement, said adjusting shaft having a handle on its forward end and first and second locking members mounted intermediate its ends, said first locking member being positively fixed to said shaft for selective rotation therewith into or out of locking engagement with at least one of a series of fore and aft positioned teeth on said bottom frame to lock or unlock said bottom frame to said top frame, said second locking member being mounted on said shaft for selective rotation into or out of locking engagement with at least one of a series of fore and aft positioned teeth on said intermediate frame, said adjusting shaft being rotatable by said handle between a first "lockout" position in which both of said first and second locking members are engaged to lock all of the frames together, a second "isolate" position in which only said second locking member is engaged so that said intermediate frame is locked to said top frame for movement therewith relative to said bottom frame against said resilient biasing means, and a third "adjust" position wherein both of said locking members are disengaged so that the top frame may be freely adjusted to any desired position relative to said bottom frame.

2. The assembly of claim 1 wherein said intermediate frame has spaced apertured vertical mounting portions by which said intermediate frame is freely suspended from said adusting shaft.

3. The assembly of claim 1 wherein the movement of the intermediate frame in said "isolation" mode is relative to said bottom frame and is resiliently resisted by a tension-compression spring which is anchored at one of its ends to the bottom frame and is anchored at the other one of its ends to said intermediate frame.

4. The assembly of claim 3 in which relilient bumpers are mounted on said bottom frame to engage fore and aft portions of said intermediate frame and limit the distance to which said spring can be expanded or compressed.

5. The assembly of claim 1 wherein each of said top, bottom and intermediate frames have identical mounting and locking structures on each side of the seat with the central area of all of the frames being open so that portions of a seat suspension to which the lower frame is adapted to be attached can move vertically within the confines of said frames.

6. The assembly of claim 5 wherein an adjusting shaft is located on each side of the seat but only one of said shafts includes a handle, the other shaft being connected to said one shaft by a linkage mechanism so as to move in synchronism therewith.

7. The assembly of claim 6 wherein said linkage mechanism is adjustable.

8. The assembly of claim 1 wherein said second locking member is a pawl member mounted on said shaft in a "lost-motion" arrangement so that rotation of said shaft from its "lockout" position to its "isolate" position will disengage the first locking member while permitting said second locking member to remain engaged until said shaft is additionally rotated to its "adjust" position.

9. The assembly of claim 8 wherein a torsion spring biases said second locking member toward its engaged position.

10. The assembly of claim 9 wherein said adjustor shaft is mounted to an overcenter spring assembly which urges it to either its "lockout" position or its "isolate" position.

11. The assembly of claim 10 wherein the spring in the overcenter spring assembly is chosen such that the second locking member will be maintained by said torsion spring in locking engagement with the teeth on said intermediate frame in the "isolate" position despite the torque exerted on the shaft by the overcenter spring.

* * * * *